US012437678B2

(12) United States Patent
Diggins et al.

(10) Patent No.: US 12,437,678 B2
(45) Date of Patent: Oct. 7, 2025

(54) SIGN HOLDER APPARATUS

(71) Applicants: Donnell Diggins, South Bend, IN (US); Dasey Diggins, South Bend, IN (US)

(72) Inventors: Donnell Diggins, South Bend, IN (US); Dasey Diggins, South Bend, IN (US)

( * ) Notice: Subject to any disclaimer, the term of this patent is extended or adjusted under 35 U.S.C. 154(b) by 168 days.

(21) Appl. No.: 18/209,794

(22) Filed: Jun. 14, 2023

(65) Prior Publication Data

US 2024/0420602 A1 Dec. 19, 2024

(51) Int. Cl.
*G09F 7/18* (2006.01)

(52) U.S. Cl.
CPC ........ *G09F 7/18* (2013.01); *G09F 2007/1843* (2013.01); *G09F 2007/1856* (2013.01)

(58) Field of Classification Search
CPC ............... G09F 7/18; G09F 2007/1843; G09F 2007/1856
See application file for complete search history.

(56) References Cited

U.S. PATENT DOCUMENTS 2,134,833 A * 11/1938 Morton ............... G09F 15/0006 40/606.18
3,132,431 A 5/1964 Petrie
3,525,493 A * 8/1970 Newell ................. F16B 5/0614 40/658
4,092,792 A 6/1978 Vorhees
4,916,840 A * 4/1990 Getz ......................... G09F 7/20 40/607.05
5,083,390 A * 1/1992 Edman ...................... G09F 7/18 40/607.1
D342,285 S * 12/1993 Boyar ............................ D20/41
D503,748 S * 4/2005 Crawford ....................... D20/41
D582,485 S 12/2008 Glass, Jr
7,490,424 B2 * 2/2009 Caterinacci ............... G09F 7/20 40/606.14
8,707,597 B1 4/2014 Cavalieri
10,497,291 B1 * 12/2019 Bailey ....................... G09F 1/12
10,867,529 B2 12/2020 Huenefeld
2006/0101690 A1 * 5/2006 Terbet ................ G09F 15/0006 40/607.09
2017/0132957 A1 * 5/2017 Logan ..................... G09F 17/00
2018/0184818 A1 7/2018 Gaar

FOREIGN PATENT DOCUMENTS

CA 2712031 2/2011
GB 2612600 A * 5/2023 ............. E01F 9/688

* cited by examiner

*Primary Examiner* — Cassandra Davis

(57) ABSTRACT

A sign holder apparatus for holding large yard signs over a ground surface includes a frame having a U-shape and a receiver extending along an inner edge of the frame. The receiver comprises a pair of spaced apart rails which defines a groove therebetween for receiving the yard sign therein. A plurality of retainers is coupled to the receiver and positioned in the groove. Each retainer comprises a pair of protrusions which each extend into the groove to grip the yard sign. A plurality of stakes is attached to the frame to attach the frame to the ground surface.

13 Claims, 6 Drawing Sheets

SIGN HOLDER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sign holders and more particularly pertains to a new sign holder for holding large yard signs over a ground surface.

(2) Description of Related Art Including Information Disclosed Under 37 CFR 1.97 and 1.98

The prior art describes myriad sign holders which receive a sign into a groove formed in a three-sided frame to hold the sign. However, the prior art fails to disclose such an apparatus which includes projections within the groove which grip the sign to retain the sign in the groove and which has multiple stakes extending downwardly to secure the frame to a ground surface. Such an apparatus is advantageous in providing an alternative to the prior art to secure a sign within the groove.

BRIEF SUMMARY OF THE INVENTION

An embodiment of the disclosure meets the needs presented above by generally comprising a frame which has a U-shape and which comprises a bottom member and a pair of lateral members. The bottom member is coupled to and extends between the pair of lateral members. A receiver is coupled to the frame. The receiver is positioned on an inner edge of the frame and extends along the bottom member and each one of the pair of lateral members. The receiver comprises a pair of rails. The rails of the pair of rails are spaced from each other to define a groove therebetween. The groove has a size such that the receiver is configured for slidably receiving the yard sign into the groove from a top end of the frame.

A plurality of retainers is coupled to the receiver and is positioned in the groove. Each retainer of the plurality of retainers comprises a pair of protrusions. Each protrusion of the pair of protrusions is coupled to an associated one of the pair of rails of the receiver and extends into the groove. The pair of protrusions is configured to grip the yard sign with a force fit to retain the yard sign in the groove. A plurality of stakes is coupled to and extends downwardly from the frame. Each stake of the plurality of stakes has a pointed end such that the stake is configured for is driven into a ground surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
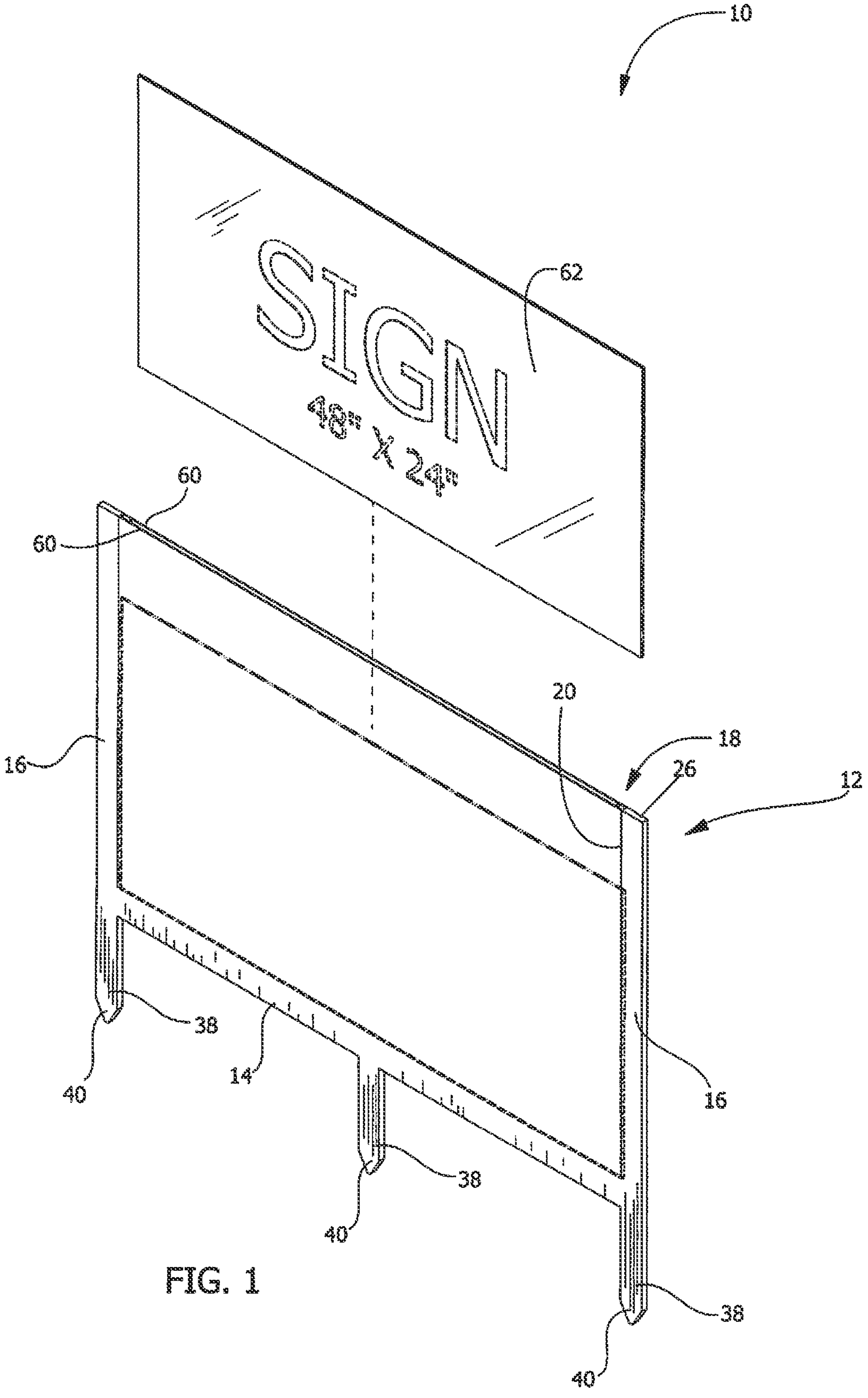
FIG. 1 is an exploded perspective view of a sign holder apparatus according to an embodiment of the disclosure.
Figure 2:
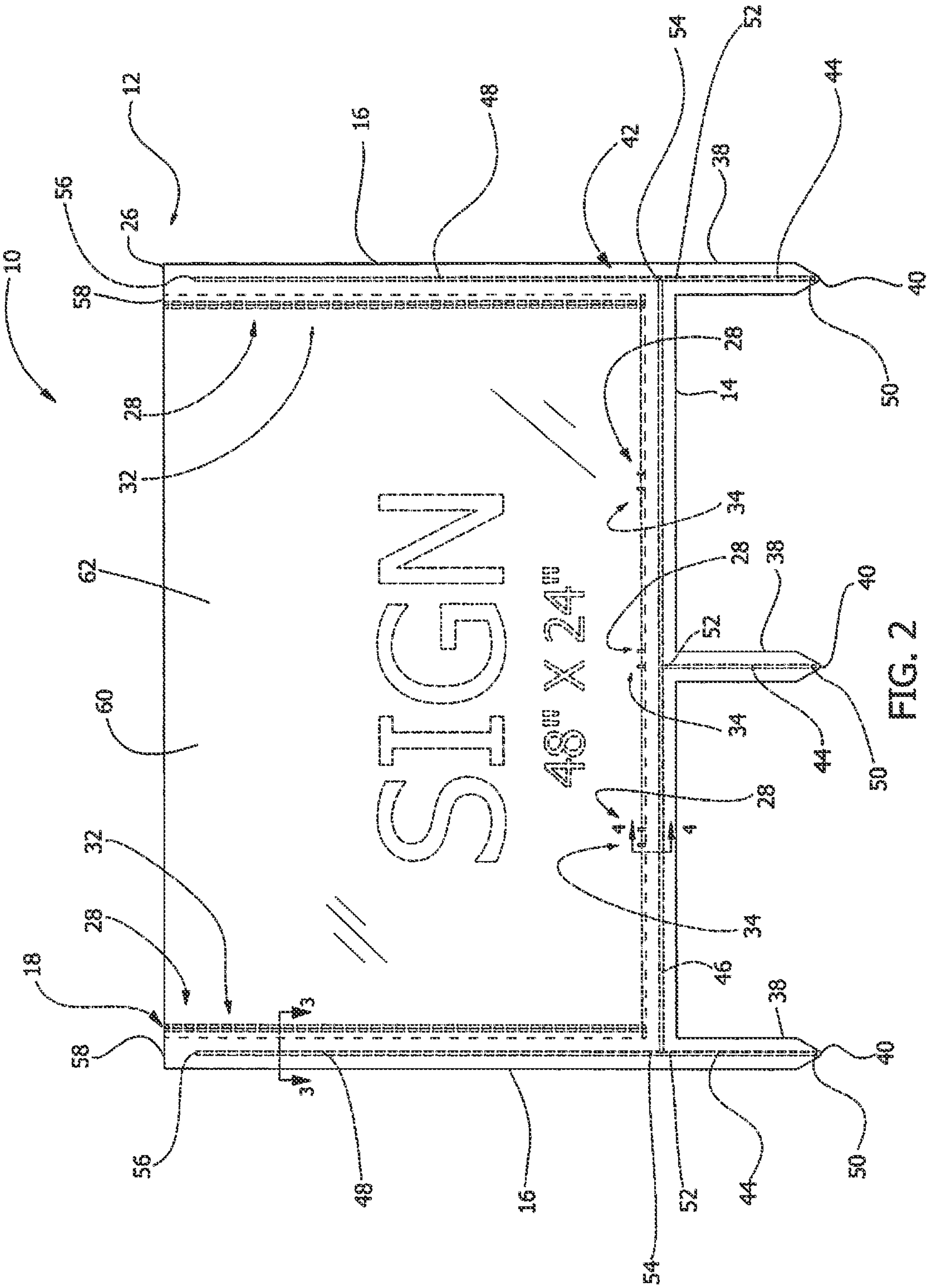
FIG. 2 is a front view of an embodiment of the disclosure.
Figure 3:
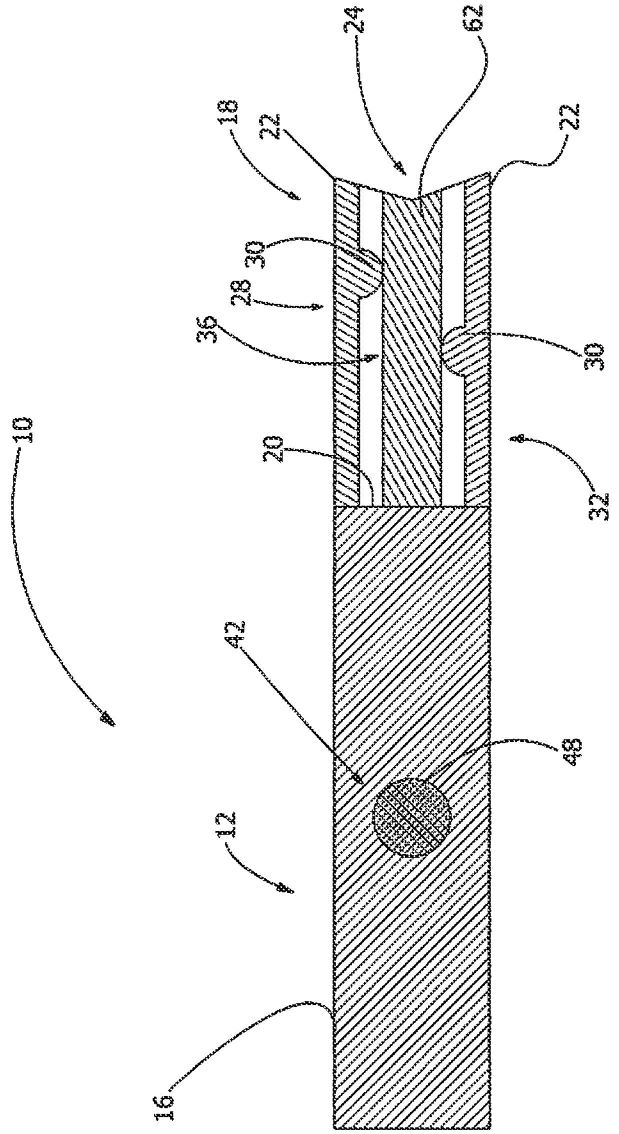
FIG. 3 is a cross section view of an embodiment of the disclosure taken from Arrows 3-3 in FIG. 2.
Figure 4:
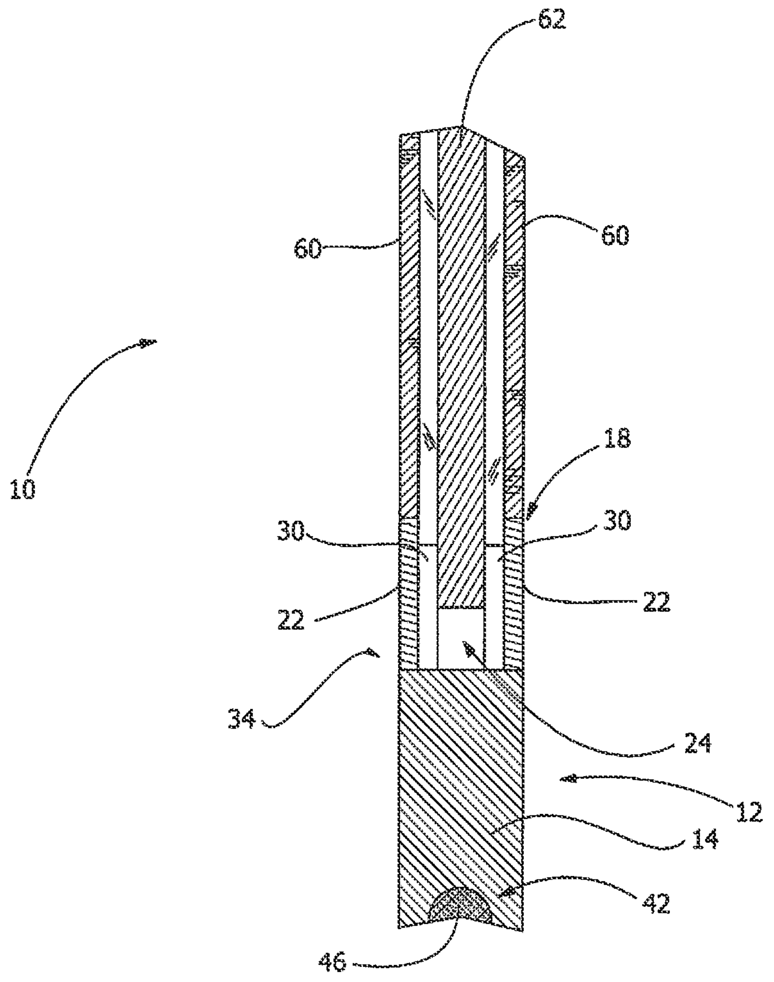
FIG. 4 is a cross-section view of an embodiment of the disclosure taken from Arrows 4-4 in FIG. 2.
Figure 5:
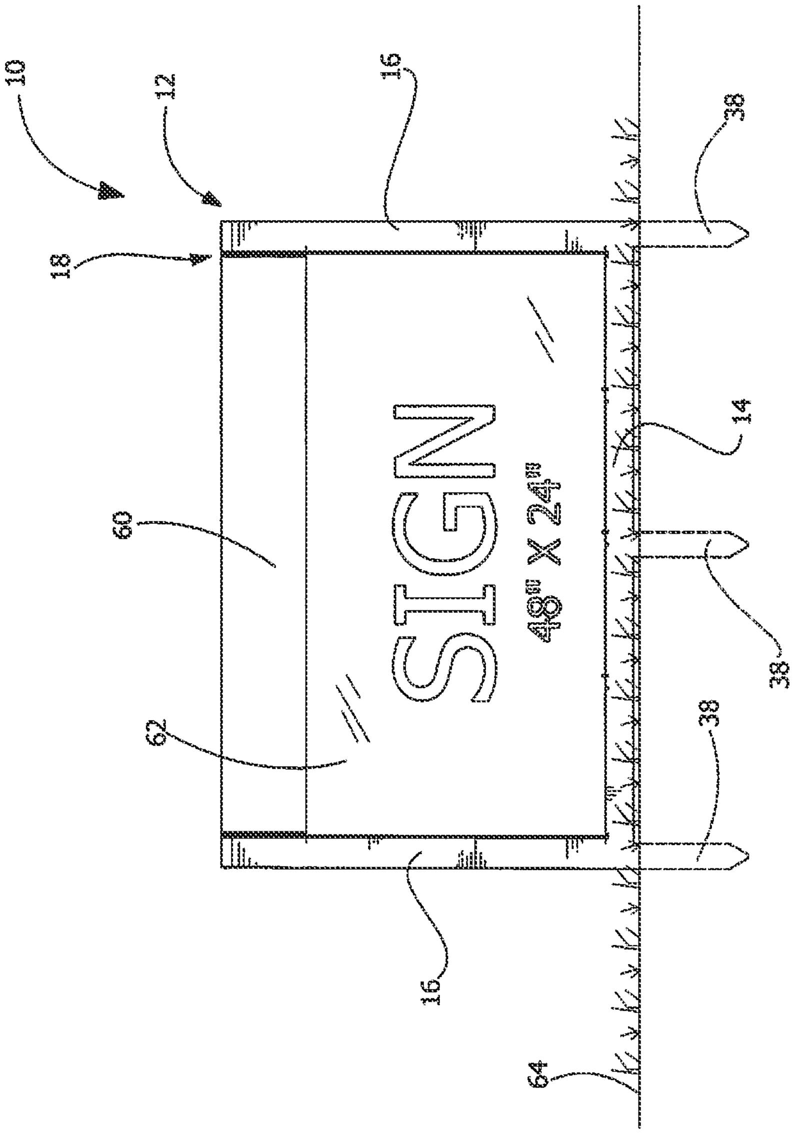
FIG. 5 is a front in-use view of an embodiment of the disclosure.
Figure 6:
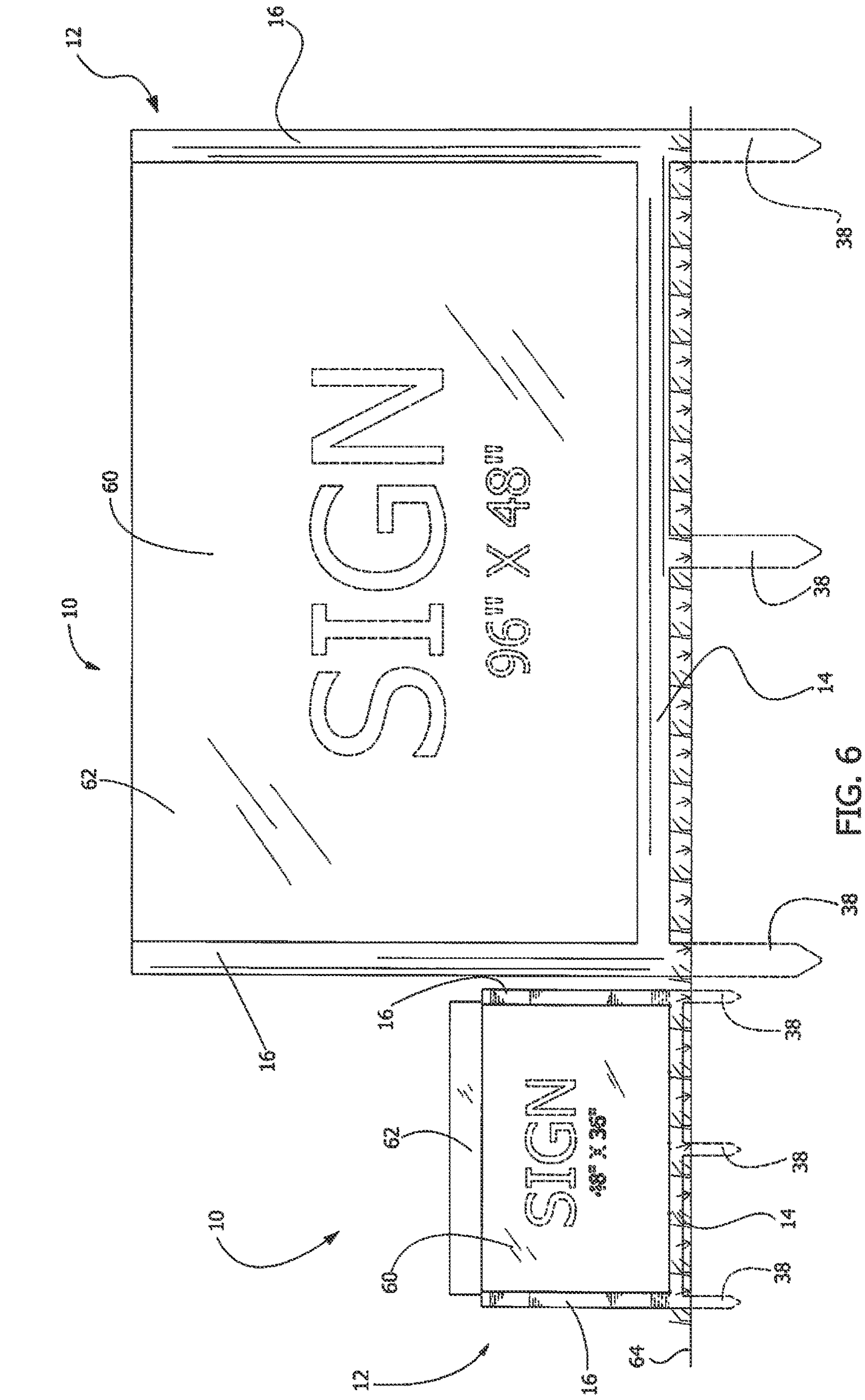
FIG. 6 is a front in-use view of an embodiment of the disclosure.

With reference now to the drawings, and in particular to FIGS. 1 through 6 thereof, a new sign holder embodying the principles and concepts of an embodiment of the disclosure and generally designated by the reference numeral 10 will be described.

As best illustrated in FIGS. 1 through 6, the sign holder apparatus 10 generally comprises a frame 12 which has a U-shape and which comprises a bottom member 14 and a pair of lateral members 16. The bottom member 14 is coupled to and extends between the pair of lateral members 16. A receiver 18 is coupled to the frame 12. The receiver 18 is positioned on an inner edge 20 of the frame 12 and extends along the bottom member 14 and each one of the pair of lateral members 16. The receiver 18 comprises a pair of rails 22. The rails 22 of the pair of rails 22 are spaced from each other to define a groove 24 therebetween which has a size such that the receiver 18 is configured for slidably receiving a yard sign 62 into the groove 24 from a top end 26 of the frame 12.

A plurality of retainers 28 is coupled to the receiver 18 and is positioned in the groove 24. Each retainer 28 of the plurality of retainers 28 comprises a pair of protrusions 30. Each protrusion 30 of the pair of protrusions 30 is coupled to an associated one of the pair of rails 22 of the receiver 18 and extends into the groove 24. The pair of protrusions 30 is configured to grip the yard sign 62 with a force fit to retain the yard sign 62 in the groove 24. The protrusions 30 of the pair of protrusions 30 are laterally spaced from each other with respect to the frame 12.

The plurality of retainers 28 includes a pair of lateral retainers 32 and a plurality of bottom retainers 34. Each lateral retainer 32 of the pair of lateral retainers 32 is positioned in an associated one of a pair of lateral portions 36 of the groove 24. Each protrusion 30 of the pair of protrusions 30 of each lateral retainer 32 of the pair of lateral retainers 32 is oriented vertically and extends a full length of the associated lateral portion 36 of the groove 24. The plurality of bottom retainers 34 is distributed along a bottom portion of the groove 24. Each protrusion 30 of the pair of protrusions 30 of each bottom retainer 34 of the plurality of bottom retainers 34 extends upwardly from the bottom member 14 of the frame 12.

A plurality of stakes 38 is coupled to and extends downwardly from the frame 12. Each stake 38 of the plurality of stakes 38 has a pointed end 40 such that the stake 38 is configured for being driven into a ground surface 64. A reinforcement member 42 is embedded in and extends through the frame 12 and each one of the plurality of stakes 38. The reinforcement member 42 comprises a wire.

The reinforcement member 42 comprises a plurality of stake segments 44, a cross segment 46, and a pair of lateral segments 48. Each stake segment 44 of the plurality of stake segments 44 extends vertically through an associated one of the plurality of stakes 38. Each stake segment 44 of the plurality of stake segments 44 has a distal end 50 relative to the frame 12. The distal end 50 of each stake segment 44 of the plurality of stake segments 44 is positioned at the pointed end 40 of the associated stake 38. A top portion 52 of each stake segment 44 of the plurality of stake segments 44 extends upwardly into the frame 12, and each stake segment 44 of the plurality of stake segments 44 is centered in the associated stake 38.

The cross segment 46 extends horizontally through the bottom member 14 of the frame 12 and is coupled to each one of the plurality of stake segments 44. The cross segment 46 is elongated and is aligned with a central longitudinal axis of the bottom member 14 of the frame 12. Each lateral segment 48 of the pair of lateral segments 48 extends vertically through an associated one of the pair of lateral members 16 of the frame 12. Each lateral segment 48 of the pair of lateral segments 48 is coupled to the cross segment 46. Each lateral segment 48 of the pair of lateral segments 48 is centered in the associated lateral member 16 of the frame 12. A lower portion 54 of each lateral segment 48 of the pair of lateral segments 48 extends into the bottom member 14 of the frame 12 to the cross segment 46, and an upper end 56 of each lateral segment 48 of the pair of lateral segments 48 is spaced below a topmost end 58 of the associated lateral member 16 of the frame 12.

A pair of shields 60 is coupled to the frame 12. Each shield 60 of the pair of shields 60 extends between the pair of lateral members 16 and along the bottom member 14 of the frame 12. The shields 60 of the pair of shields 60 are spaced from each other at a distance such that the pair of shields 60 are configured for receiving the yard sign 62 therebetween when the yard sign 62 is received into the receiver 18. Each shield 60 of the pair of shields 60 is translucent such that the shield 60 is configured for facilitating viewing of the yard sign 62 through the shield 60.

The frame 12, the receiver 18, and the plurality of stakes 38 are integrally formed and may comprise a molded plastic or similar material. The wire of the reinforcement member 42 may comprise a metal or like material. The shield 60 may comprise an acrylic, a polycarbonate, or the like. The sign holder apparatus 10 may be adapted to several different sizes of yard sign 62. For example, in a first embodiment, a distance between the pair of lateral members 16 of the frame 12 is between 42.0 inches and 54.0 inches and a distance between the topmost end 58 of each lateral member 16 of the pair of lateral members 16 and the bottom member 14 is equal to or greater than 24.0 inches. In a second embodiment, the distance between the pair of the lateral members 16 of the frame 12 is between is between 90.0 inches and 112.0 inches and the distance between the topmost end 58 of each lateral member 16 of the pair of lateral members 16 and the bottom member 14 is equal to or greater than 48.0 inches.

In use, the frame 12 is attached to the ground surface 64 via the plurality of stakes 38 and the yard sign 62 is positioned in the receiver 18 such that the plurality of retainers 28 grip the yard sign 62 to retain the yard sign 62 in the groove 24 of the receiver 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A sign holder apparatus for holding a yard sign, the apparatus comprising:

a frame having a U-shape and comprising a bottom member and a pair of lateral members, the bottom member being coupled to and extending between the pair of lateral members;

a receiver being coupled to the frame, the receiver being positioned on an inner edge of the frame and extending along the bottom member and each one of the pair of lateral members, the receiver comprising a pair of rails, the pair of rails being spaced from each other to define a groove therebetween, the groove having a size such that the receiver is configured for slidably receiving the yard sign into the groove from a top end of the frame;

a plurality of retainers being coupled to the receiver and being positioned in the groove, each retainer of the plurality of retainers comprising a pair of protrusions, each protrusion of the pair of protrusions being coupled to an associated one of the pair of rails of the receiver and extending into the groove, the pair of protrusions being configured to grip the yard sign with a force fit to retain the yard sign in the groove;

a plurality of stakes being coupled to and extending downwardly from the frame, each stake of the plurality of stakes having a pointed end such that the stake is configured for being driven into a ground surface; and a reinforcement member being embedded in and extending through the frame and each one of the plurality of stakes, wherein the reinforcement member comprises a wire.

2. The apparatus of claim 1, wherein the protrusions of the pair of protrusions are laterally spaced from each other with respect to the frame.

3. The apparatus of claim 1, wherein the plurality of retainers includes a pair of lateral retainers, each lateral retainer of the pair of lateral retainers being positioned in an associated one of a pair of lateral portions of the groove, each protrusion of the pair of protrusions of each lateral retainer of the pair of lateral retainers being oriented vertically and extending a full length of the associated lateral portion of the groove.

4. The apparatus of claim 1, wherein the plurality of retainers includes a plurality of bottom retainers distributed along a bottom portion of the groove, each protrusion of the pair of protrusions of each bottom retainer of the plurality of bottom retainers extending upwardly from the bottom member of the frame.

5. The apparatus of claim 1, wherein the reinforcement member comprises:

a plurality of stake segments, each stake segment of the plurality of stake segments extending vertically through an associated one of the plurality of stakes;

a cross segment extending horizontally through the bottom member of the frame, the cross segment being coupled to each one of the plurality of stake segments; and a pair of lateral segments, each lateral segment of the pair of lateral segments extending vertically through an associated one of the pair of lateral members of the frame, each lateral segment of the pair of lateral segments being coupled to the cross segment.

6. The apparatus of claim 5, wherein each stake segment of the plurality of stake segments has a distal end relative to the frame, the distal end of each stake segment of the plurality of stake segments being positioned at the pointed end of the associated stake.

7. The apparatus of claim 5, wherein each stake segment of the plurality of stake segments being centered in the associated stake.

8. The apparatus of claim 5, wherein:

the cross segment is elongated and being aligned with a central longitudinal axis of the bottom member of the frame;

A top portion of each stake segment of the plurality of stake segments extends upwardly into the frame to the cross segment; and a lower portion of each lateral segment of the pair of lateral segments extending into the bottom member of the frame to the cross segment.

9. The apparatus of claim 5, wherein each lateral segment of the pair of lateral segments is centered in the associated lateral member of the frame.

10. The apparatus of claim 5, wherein an upper end of each lateral segment of the pair of lateral segments is spaced below a topmost end of the associated lateral member of the frame.

11. The apparatus of claim 1, wherein the frame, the receiver, and the plurality of stakes are integrally formed.

12. A sign holder apparatus for holding a yard sign, the apparatus comprising:

a frame having a U-shape and comprising a bottom member and a pair of lateral members, the bottom member being coupled to and extending between the pair of lateral members;

a receiver being coupled to the frame, the receiver being positioned on an inner edge of the frame and extending along the bottom member and each one of the pair of lateral members, the receiver comprising a pair of rails, the pair of rails being spaced from each other to define a groove therebetween, the groove having a size such that the receiver is configured for slidably receiving the yard sign into the groove from a top end of the frame;

a plurality of retainers being coupled to the receiver and being positioned in the groove, each retainer of the plurality of retainers comprising a pair of protrusions, each protrusion of the pair of protrusions being coupled to an associated one of the pair of rails of the receiver and extending into the groove, the pair of protrusions being configured to grip the yard sign with a force fit to retain the yard sign in the groove;

a plurality of stakes being coupled to and extending downwardly from the frame, each stake of the plurality of stakes having a pointed end such that the stake is configured for being driven into a ground surface; and a pair of shields being coupled to the frame, each shield of the pair of shields extending between the pair of lateral members and along the bottom member of the frame, the pair of shields being spaced from each other at a distance such that the pair of shields are configured for receiving the yard sign therebetween when the yard sign is received into the receiver, each shield of the pair of shields being translucent such that the shield is configured for facilitating viewing of the yard sign through the shield.

13. A sign holder apparatus for holding a yard sign, the apparatus comprising:

a frame having a U-shape and comprising a bottom member and a pair of lateral members, the bottom member being coupled to and extending between the pair of lateral members;

a receiver being coupled to the frame, the receiver being positioned on an inner edge of the frame and extending along the bottom member and each one of the pair of lateral members, the receiver comprising a pair of rails, the pair of rails being spaced from each other to define a groove therebetween, the groove having a size such that the receiver is configured for slidably receiving the yard sign into the groove from a top end of the frame;

a plurality of retainers being coupled to the receiver and being positioned in the groove, each retainer of the plurality of retainers comprising a pair of protrusions, each protrusion of the pair of protrusions being coupled to an associated one of the pair of rails of the receiver and extending into the groove, the pair of protrusions being configured to grip the yard sign with a force fit to retain the yard sign in the groove, the pair of protrusions being laterally spaced from each other with respect to the frame, the plurality of retainers including:

a pair of lateral retainers, each lateral retainer of the pair of lateral retainers being positioned in an associated one of a pair of lateral portions of the groove, each protrusion of the pair of protrusions of each lateral retainer of the pair of lateral retainers being oriented vertically and extending a full length of the associated lateral portion of the groove; and a plurality of bottom retainers distributed along a bottom portion of the groove, each protrusion of the pair of protrusions of each bottom retainer of the plurality of bottom retainers extending upwardly from the bottom member of the frame;

a plurality of stakes being coupled to and extending downwardly from the frame, each stake of the plurality of stakes having a pointed end such that the stake is configured for being driven into a ground surface;

a reinforcement member being embedded in and extending through the frame and each one of the plurality of stakes, the reinforcement member comprising a wire, the reinforcement member comprising:

a plurality of stake segments, each stake segment of the plurality of stake segments extending vertically through an associated one of the plurality of stakes, each stake segment of the plurality of stake segments having a distal end relative to the frame, the distal end of each stake segment of the plurality of stake segments being positioned at the pointed end of the associated stake, A top portion of each stake segment of the plurality of stake segments extending upwardly into the frame, each stake segment of the plurality of stake segments being centered in the associated stake;

a cross segment extending horizontally through the bottom member of the frame, the cross segment being coupled to each one of the plurality of stake segments, the cross segment being elongated and being aligned with a central longitudinal axis of the bottom member of the frame; and a pair of lateral segments, each lateral segment of the pair of lateral segments extending vertically through an associated one of the pair of lateral members of the frame, each lateral segment of the pair of lateral segments being coupled to the cross segment, each lateral segment of the pair of lateral segments being centered in the associated lateral member of the frame, a lower portion of each lateral segment of the pair of lateral segments extending into the bottom member of the frame to the cross segment, an upper end of each lateral segment of the pair of lateral segments being spaced below a topmost end of the associated lateral member of the frame;

a pair of shields being coupled to the frame, each shield of the pair of shields extending between the pair of lateral members and along the bottom member of the frame, the pair of shields being spaced from each other at a distance such that the pair of shields are configured for receiving the yard sign therebetween when the yard sign is received into the receiver, each shield of the pair of shields being translucent such that the shield is configured for facilitating viewing of the yard sign through the shield;

wherein the frame, the receiver, and the plurality of stakes are integrally formed.

* * * * *